United States Patent [19]
Nixon et al.

[11] 3,724,904
[45] Apr. 3, 1973

[54] WHEEL BALANCING DEVICE

[75] Inventors: Charles Roy Nixon; Anton Gasafi, both of Downsview, Ontario, Canada

[73] Assignee: Charles Roy Nixon, Downsview, Ontario, Canada

[22] Filed: Mar. 8, 1971

[21] Appl. No.: 121,739

[30] Foreign Application Priority Data

Mar. 26, 1970 Canada...................................078470

[52] U.S. Cl...............................................301/5 BA
[51] Int. Cl. ..............................................B60b 13/00
[58] Field of Search............301/5 BA, 5 B; 74/573 F

[56] References Cited

UNITED STATES PATENTS

| 1,314,005 | 8/1919 | Louden..............................301/5 BA |
| 3,164,413 | 1/1965 | Salathiel............................301/5 BA |

*Primary Examiner*—Richard J. Johnson
*Attorney*—George A. Rolston

[57] ABSTRACT

An annular tube of rectangular cross-section, extruded into a predetermined shape corresponding to the interior profile of the vehicle wheel rim, and further comprising a plurality of movable weights in the shape of cylindrical discs or rollers of somewhat reduced cross-sectional dimension in relation to the interior cross-section of the tube so as to roll freely therearound, and a certain predetermined quantity of damping liquid such as oil or the like to damp the movement of the weights. A number of attachment clips are spaced around the annular tube so as to both fasten the same firmly into position in the vehicle wheel, and also to locate the same in a predetermined location spaced from the vehicle wheel rim so as to hold the tube out of contact with the rim. The design and shape of the tube is such that it is possessed of very great inherent resistance to distortion, and the wear on the interior of the tube is greatly reduced by the use of cylindrical rollers as opposed to spherical balls.

3 Claims, 5 Drawing Figures

PATENTED APR 3 1973  3,724,904

INVENTOR.

BY: George A. Rolston

WHEEL BALANCING DEVICE

The present invention relates to an automatic wheel balancer for vehicles such as trucks, automobiles and the like employing inflatable tires.

The so-called "dynamic" or automatic balancing of a rotating wheel, by means of weight running in an annular track, has been known for very many years. Examples of such dynamic balancers are shown in the patent art, including the following U.S. Letters Patent, namely, U.S. Pat. Nos. 414,642, 1,314,005, 331,450, 2,812,215, 2,771,240, 3,164,413, and 3,316,021.

Despite all of the previous efforts in this field, however, the dynamic wheel balancers available do not perform satisfactorily in use on vehicle wheels.

This is due to a variety of reasons. Principally however, the basic problem in the balancing of a wheel, whether with lead weights or with a dynamic balancing system, is that in order to be fully effective, the location of the balancing weights should preferably be as close to the outer perimeter of the wheel as possible. As the location of the balance weight approaches to the center of rotation, its effect becomes greatly reduced, thus requiring a much greater mass to balance even a relatively small out of balance condition occurring, for example, in the tread of an automobile tire, due to faulty manufacture, or for example, due to uneven wear. A further factor affecting the effectiveness of wheel balancing devices on vehicle wheels employing inflatable tires is that as the speed of the vehicle increases the shape of the tire becomes greatly distorted, and the out of balance location in the tire may in fact move as a result of such distortion. Thus, the use of fixed weight, can generally speaking, only balance the wheel at an average speed.

In the past, automatic wheel balancing devices have been proposed, such as are described in the above-identified patents, in which an annular tube is attached to the rim of the vehicle wheel, and contains a quantity of movable weights, and a quantity of liquid. As the wheel rotates, the movable weights will tend to move around the tube to a point more or less opposite to the location of an out of balance mass in the vehicle tire, and the movement of the weight is damped by the liquid in the tube. These devices have had certain advantages over the use of fixed weights in that the movable weights would move around the tube gradually as the vehicle increased in speed for example to compensate for any movement in the location of the out of balance portion of the tire. Similarly, as the tire became worn and the out of balance of location was displaced, the weights would similarly move to compensate for this. However, even these automatic systems were capable of compensating for only a very limited range of tire eccentricities. Thus, if in a given tire, an excess mass of one or two ounces of material was present at any particular location, then such automatic balancing systems would be capable of compensating relatively adequately. However, if, as in the majority of cases, the out of balance mass on a given tire is much greater, i.e., up to 4 or 6 ounces in many cases, such systems were completely incapable of providing adequate compensation, due in part to the fact that the weights were located very much closer to the center of rotation than the perimeter of the tire and also due to the fact that the weights were necessarily strung out around an arc of the tube rather than concentrated at any one particular location. In order to overcome the shortcomings of such automatic wheel balancing devices, it was the standard practice to first of all balance the wheels by conventional means employing fixed weights, so that they were more or less balanced for a predetermined average speed in the region of forty to 45 miles an hour. Then the automatic wheel balancing device was attached to the rim of the wheel, and any minor imbalance condition which developed above the average speed would then be compensated for automatically. However, the overall cost of the use of both fixed balancing weights and the automatic balancing device was so great as to make it virtually unsaleable. In addition, as the tires became worn down the effectiveness of the fixed balancing weights was reduced, and when changeovers were made from summer to winter tires, for example, it was necessary to rebalance the wheels on each occasion. Thus, there was no saving in running costs on the automobile whatever, and the economic advantages of an automatic wheel balancing device were completely lost.

In addition to these practical problems, it was also found that the design of such prior wheel balancing devices resulted in the development of excessive wear within the annular tube, caused by continual friction of the spherical weights along the apex of the tube, while the wheels were rotating, thereby materially shortening the life of the device. In addition, it was difficult to secure the annular tube to the vehicle wheel, with the result that in use, the device had a tendency to become loosened or detached entirely and lost. Similarly, the design of the tube was such that it had a tendency to whip to and fro in use or chatter against the rim of the wheel, thereby causing displacement of the spherical weights within the tube.

BRIEF SUMMARY OF THE INVENTION

The present invention seeks to overcome these various disadvantages by the provision of an automatic wheel balancing device comprising essentially an annular tube of rectangular cross-section, extruded into a predetermined shape corresponding to the interior profile of the vehicle wheel rim, and further comprising a plurality of movable weights in the shape of cylindrical discs or rollers of somewhat reduced cross-sectional dimension in relation to the interior cross-section of the tube so as to roll freely therearound, and a certain predetermined quantity of damping liquid such as oil or the like to damp the movement of the weights. A number of attachment clips are spaced around the annular tube so as to both fasten the same firmly into position in the vehicle wheel, and also to locate the same in a predetermined location spaced from the vehicle wheel rim so as t hold the tube out of contact with the rim. The design and shape of the tube is such that it is possessed of very great inherent resistance to distortion, and the wear on the interior of the tube is greatly reduced by the use of cylindrical rollers as opposed to spherical balls. Thus by the use of the invention, a greatly increased movable mass is incorporated within the tube, and the tube is substantially free of any distortion in use, thereby eliminating whipping or chatter of the tube, and wear on the interior of the tube is substantially eliminated.

The foregoing and other advantages will become apparent from the following description of the preferred embodiment of the invention which is given here by way of example only with reference to the following drawings in which like reference devices refer to like parts thereof throughout the various views and diagrams and in which.

Figure 1:
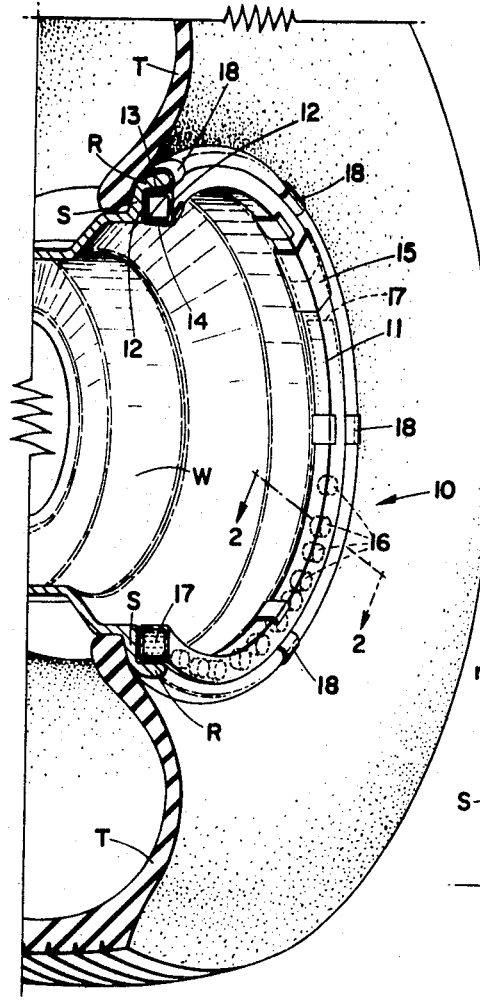
FIG. 1 is a partially cut-away perspective illustration of a vehicle wheel and tire showing the automatic balancing device of the invention in position thereon.

Referring now to FIG. 1, it will be seen that this preferred embodiment of the invention is in use applied to a typical automobile wheel indicated generally at W, having a rim R of predetermined shape extending upwardly therefrom formed integrally with a side wall S. An inflatable tire T is shown supported on the rim R in accordance with a well known practice.

The automatic balancing device indicated by the general reference arrow 10 is shown attached within the recess defined by the side wall S and the rim R of the wheel W, which, as noted, is spaced substantially inwardly with respect to the tread of the tire T, where any area of imbalance due to manufacturing or uneven wear, will normally occur. As shown in FIG. 1, the balancing device 10 will be seen to consist of an annular tube 11 of rectangular cross-section having side walls 12, a top wall 13 and a bottom wall 14, the two side walls 12 being of greater length than the top and bottom walls 13 and 14 as shown, in order to provide greater space within the tube 11. Tube 11 is formed into an annular shape, and the two ends are joined by means of the joining sleeve 15. Within the tube 11 there is located a plurality of balancing weights consisting of the disc-shaped rollers 16 which are shaped and designed so as to fit within the interior cross-section of the tube 11, and to define a certain predetermined spacing both between the side walls 12, and between the top and bottom walls 13 and 14 as shown in greater detail in FIG. 2. A quantity of damping liquid such as oil or the like indicated as 17 is located within the tube 11, filling the same to a level somewhere between two-thirds and three-quarters of the contents of the entire tube 11, the remaining upper portion of the tube 11 being empty. A series of attachment clips indicated generally as 18 are fastened around the tube 11, and grip around the rim R of the wheel W so as to hold the tube in position therein and spaced therefrom a predetermined distance.

Figure 4:
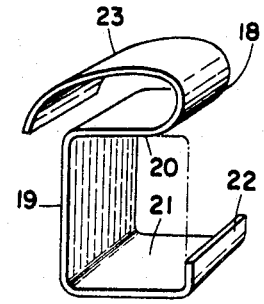
FIG. 4 is a perspective illustration of the attachment clip.

As shown in greater detail in FIG. 4, the clips 18 comprise a flat inner side wall 19, upper portion 20 and a lower portion 21, and a retaining lip 22. The shaping of wall 19, and top and bottom members 20 and 21 are designed to fit snugly around the exterior of the tube 11, and an upper curved tongue portion 23 is shaped to conform to the contour of the rim R as shown.

Figure 3:
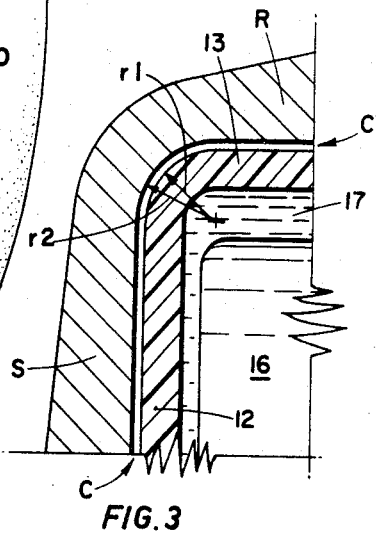
FIG. 3 is a greatly enlarged section of the detail 3 of the section shown in FIG. 2.
Figure 2:
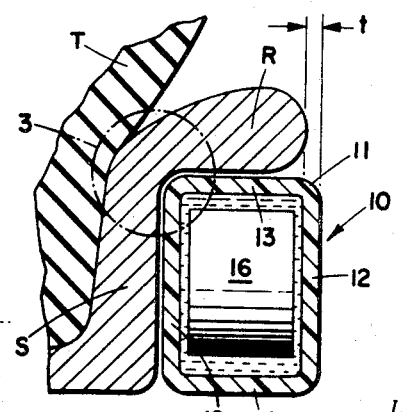
FIG. 2 is a section along the line 2—2 of FIG. 1.

The dimensions of the tube 11 are such that it is designed to fit within the predetermined spacing defined by the side wall S and the rim R of the wheel W, with a predetermined clearance indicated as C in FIG. 3 so as to avoid contact between the tube 11 and the rim R or side wall S. The width of the tube 11, as shown in FIG. 2, is preferably such that the interior cross-sectional area is preferably contained within a vertical plane intersecting the outer periphery of the rim R. Thus, the only portion of the tube 11 extending outwardly with regard to the rim R is essentially the thickness of the side wall 12, shown at T in FIG. 2. In this way, the tube 11 is substantially recessed within the rim R and is protected by the rim R from accidental damage in use, for example, when parking the vehicle. In addition, the outwardly directed forces set up by the roller weights 16 when the wheel is rotating, are contained substantially entirely within the extend of the rim R, and there is little or no tendency for the tube 11 to be thrown outwardly therefrom.

As shown in greater detail in FIG. 3, the radius of curvature of the corner between the side wall 12 and top wall 13 of the tube 11, indicated as $r_1$ is preferably smaller than the radius $r_2$ of the corner formed between the rim R and the side wall S of the wheel W, whereby to provide a continuous spacing or clearance between the rim R and side wall S and the tube 11. In addition, the corners of the roller members 16 are preferably radiussed to the same radius as the radius $r_3$ of the corner of the interior of the tube 11 so as to prevent wear or sticking of the rollers 16 in the tube 11 when the same slide from side to side during motion.

In operation, the tube 11 is formed into an annular shape as shown, after having been filled with a suitable number of rollers 16 and a suitable quantity of damping liquid 17, and is joined by the sleeve 15 as shown to the correct dimensions for the wheel W. A suitable number of clips 18 are then attached, preferably in the case of the average automobile wheel approximately eight such clips will be used equally spaced therearound, and the tongues 23 of the clips 18 are then forced around the rims R and seated firmly thereon holding the tube 11 in position.

Figure 5:
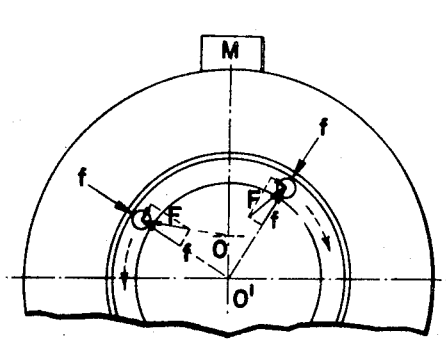
FIG. 5 is a schematic diagram showing the various forces acting on the roller weight member, when the vehicle is in motion.

When the vehicle is driven, the roller members 16 will move around the interior of the tube 11 so as to compensate for any condition of imbalance present in the wheel. In order to provide a full explanation of the engineering of such a system, reference should now be made to FIG. 5. When the wheel is not rotating the center of the wheel will coincide with the theoretical center of rotation. As the wheel begins to rotate the unbalanced weight (M) on the tire produces a force ($F = MrW^2$) and tends to pull the wheel out of its centrally located position. The wheel center (0') and mass (M) will pull away from the center of rotation 0 as shown in FIG. 5. This situation occurs at relatively low speeds where wheel vibration is not disturbing.

As the rotational velocity of the wheel increases and the wheel displacement becomes undesirable, the system will go through a vibrational resonance. At this point the position of the mass unbalance will change relative to the original displacement and the heavy side M of the wheel will rotate closer to the center of rotation. This condition is opposite to the initial slow speed position.

It is at this higher speed condition, after resonance, that the automatic wheel balancer takes over to reduce or eliminate tire unbalance. To simplify the explanation assume that only two rollers are in the automatic wheel balancer tube attached to the rim of the wheel. The centrifugal force on the roller will be equal to the weight of the roller times the distance from the center of rotation times its velocity squared. Note that the axis of this force must pass through the center of rotation. Assume the free moving rollers in the tube to be in any position, A and B, as shown in FIG. 5. FIG. 5 shows that the centrifugal force F and the force f exerted by the tube on the roller will not be in equilibrium. If the centrifugal force F is divided into components, the component along the wheel radius will equal the responding force of the tube on the roller. The other component, perpendicular to this force, will be unbalanced and will tend to move the roller within the tube in a direction opposite to the unbalanced weight M.

It can be seen from this that the rollers on either side of the unbalanced weight M will move to the light side of the wheel opposite M, and will continue to move until equilibrium is reached. Equilibrium occurs when the center of rotation (0) coincides with the center of the wheel (0'). This is, of course, the desired situation because when these two centers coincide, the wheel is in balance and the vibration has been eliminated. The limiting situation occurs when all the rollers move to the light side directly opposite the unbalanced weight (M) and their responding centrifugal force is not adequate to balance the force created by the tire unbalance. Normally, sufficient rollers are placed in the automatic wheel balancing tube to balance all reasonable tire unbalance conditions.

As stated, according to the practice of the invention, it will be understood that a sufficient number of rollers 16 of a sufficient mass will be placed within the tube 11 to provide adequate compensation for normal unbalanced conditions which may be encountered progressively during the life of the tire T on a typical vehicle. To give an example, it is found that assuming a normal wheel having a rim diameter of approximately 15 inches, as in the case of most automobiles of current design, and assuming typical design of automobile tires, which, during their life, may develop unbalanced conditions approximately 9 to 10 ounces of total movable mass will normally be required, which can readily be provided by means of some twenty to twenty-two rollers 16, each having a diameter of approximately ⅜ of an inch and a width of about ½ inch.

The rollers 16 are formed of solid steel and have a weight of about ⅜ of an ounce, thereby providing a total average movable mass of about 10 ounces. Obviously the invention is applicable to other uses such as balancing truck wheels, aircraft wheels and the like and appropriate changes of scale and size will be made accordingly. The tube 11 is formed of extruded synthetic thermo-plastic material having a high wear resistance and being highly resistant to distortion. One form of such thermo-plastic which is particularly suitable is the acrilo-nitrile-butadiene styrene class of thermo-plastic, although others having similar properties will be equally suitable.

The foregoing is a description of a preferred embodiment of the invention which is given here by way of example only. The invention is not to be taken as limited to any of the specific features as described, but comprehends all such variations thereof that come within the spirit and scope of the appended claims.

What we claim is:

1. An automatic wheel balancing device for use in association with vehicle wheels of the type having inflatable tires mounted on a rim said wheel and rim being shaped in section with a flat side wall portion, in a plane normal to the axis of rotation of the wheel, and a generally flat inwardly directed top wall extending therefrom normal thereto around said axis of rotation, said side wall and top wall meeting at a rim corner having a predetermined inner radius of curvature, said device comprising:

an annular tube of generally rectangular cross-section having an outer profile shaped and dimensioned to fit within said rim at a predetermined spacing therefrom, a corner portion of said tube being formed in section with a radius of curvature less than that of said rim corner whereby to define a predetermined equal spacing therefrom when said tube is fastened in position as aforesaid;

a plurality of weighted, generally cylindrical roller members of predetermined mass, dimensioned to fit loosely within said tube to roll freely therearound;

damping liquid means partially filling said tube, said roller members having a specific gravity greater than that of said liquid means; and, a plurality of mounting means locatable at spaced intervals around said tube to secure the same to said wheel in predetermined spaced relation to said rim.

2. The wheel balancing device as claimed in claim 1 wherein said tube is formed of a length of thermo-plastic material formed into said annular shape and including an exterior sleeve member joining the ends of said tube in abutting relation.

3. The wheel balancing device as claimed in claim 1 wherein said roller members are formed of steel and said damping fluid is oil.

* * * * *